(12) United States Patent
Vaidya et al.

(10) Patent No.: US 10,352,059 B2
(45) Date of Patent: Jul. 16, 2019

(54) MODULAR SHELTERS COMPRISING COMPOSITE PANELS

(71) Applicant: THE UAB RESEARCH FOUNDATION, Birmingham, AL (US)

(72) Inventors: Uday Vaidya, Birmingham, AL (US); Selvum Pillay, Birmingham, AL (US); Haibin Ning, Hoover, AL (US); Krishnan Balaji Thattai Parthasarathy, Clifton Park, NY (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 377 days.

(21) Appl. No.: 14/383,934

(22) PCT Filed: Mar. 15, 2013

(86) PCT No.: PCT/US2013/032364
§ 371 (c)(1),
(2) Date: Sep. 9, 2014

(87) PCT Pub. No.: WO2014/031169
PCT Pub. Date: Feb. 27, 2014

(65) Prior Publication Data
US 2015/0184414 A1 Jul. 2, 2015

Related U.S. Application Data

(60) Provisional application No. 61/692,745, filed on Aug. 24, 2012.

(51) Int. Cl.
*E04H 9/00* (2006.01)
*B32B 37/24* (2006.01)
(Continued)

(52) U.S. Cl.
CPC ............... *E04H 9/14* (2013.01); *B32B 37/24* (2013.01); *B32B 38/0004* (2013.01); *E04B 1/92* (2013.01);
(Continued)

(58) Field of Classification Search
CPC ..... E04H 9/14; E04B 1/92; E04B 1/86; B32B 38/0004; B32B 37/24; B32B 2419/00;
(Continued)

(56) References Cited

U.S. PATENT DOCUMENTS 3,365,315 A * 1/1968 Beck et al. ............... 501/33
3,707,434 A * 12/1972 Stayner ............... E04C 2/205
428/313.5

(Continued)

FOREIGN PATENT DOCUMENTS

| AT | 12007 U1 * | 9/2011 | ............... B32B 5/20 |
| WO | WO-2011064651 A2 * | 6/2011 | ......... B29B 17/0005 |
| WO | 2012007703 A1 | 1/2012 | |

OTHER PUBLICATIONS

M. Knights, Longer fiber thermoplstics extend their reach. Plastics Technology, 1-5, 2004.
(Continued)

*Primary Examiner* — Kyle J. Walraed-Sullivan
(74) *Attorney, Agent, or Firm* — Thomas|Horstemeyer, LLP; Christopher B. Linder; Jason M. Perilla (57) ABSTRACT

In some embodiments, a shelter includes an impact-resistant panel having an energy-absorbing core positioned between two outer layers, wherein the energy-absorbing core includes a syntactic foam material that has a plurality of hollow microspheres compounded with a polymeric resin.

18 Claims, 5 Drawing Sheets

(51) Int. Cl.
  *B32B 15/08* (2006.01)
  *E04H 9/14* (2006.01)
  *B32B 38/00* (2006.01)
  *E04B 1/92* (2006.01)
  *E04C 2/02* (2006.01)
  *E04B 2/00* (2006.01)

(52) U.S. Cl.
  CPC .................. *E04C 2/02* (2013.01); *E04C 2/46* (2013.01); *B32B 2419/00* (2013.01); *Y02A 50/14* (2018.01); *Y10T 428/24967* (2015.01); *Y10T 428/249971* (2015.04); *Y10T 428/249974* (2015.04)

(58) Field of Classification Search
  CPC .............. B32B 5/18; B32B 2262/101; B32B 2207/558; B32B 27/065; B32B 15/08; B32B 2250/40; E04C 2/02; E04C 2/46; E04C 2/043; B29C 70/66; Y10T 428/249971; B29K 2105/165
  USPC .................. 428/313.3, 323, 313.5
  See application file for complete search history.

(56) References Cited

U.S. PATENT DOCUMENTS

| | | | | |
|---|---|---|---|---|
| 4,013,810 | A * | 3/1977 | Long | B29C 70/025 428/313.9 |
| 4,025,686 | A * | 5/1977 | Zion | B29C 70/025 442/373 |
| 4,077,922 | A * | 3/1978 | Farrissey et al. | 523/219 |
| 4,095,008 | A * | 6/1978 | Sundstrom et al. | 428/215 |
| 4,303,730 | A | 12/1981 | Torobin | |
| 4,748,790 | A | 6/1988 | Frangolacci | |
| 4,861,649 | A * | 8/1989 | Browne | B32B 5/24 442/372 |
| 5,030,488 | A * | 7/1991 | Sobolev | B29C 70/028 428/35.9 |
| 5,333,421 | A * | 8/1994 | McKenna | 52/86 |
| 5,356,958 | A * | 10/1994 | Matthews | 523/219 |
| 5,407,983 | A * | 4/1995 | Naton | 524/113 |
| 5,587,231 | A * | 12/1996 | Mereer | B29C 70/086 442/375 |
| 5,720,913 | A * | 2/1998 | Andersen | B01F 3/1214 264/108 |
| 5,773,121 | A * | 6/1998 | Meteer | B29C 70/086 156/145 |
| 5,888,642 | A * | 3/1999 | Meteer et al. | 428/313.5 |
| 5,960,592 | A | 10/1999 | Lilienthal, II et al. | |
| 6,068,915 | A * | 5/2000 | Harrison et al. | 428/313.5 |
| 6,084,000 | A * | 7/2000 | Weiser | B01J 13/04 521/134 |
| 6,224,815 | B1 * | 5/2001 | LaCroix | B28B 7/0061 264/333 |
| 6,355,331 | B2 * | 3/2002 | Hillier | B32B 7/00 428/116 |
| H2047 | H * | 9/2002 | Harrison | B32B 7/12 428/297.4 |
| 6,482,496 | B1 * | 11/2002 | Wycech | B29C 44/12 296/146.6 |
| 6,495,088 | B1 * | 12/2002 | Coffin | B29C 70/086 264/102 |
| 6,532,641 | B2 * | 3/2003 | Hillier | B32B 3/12 29/527.4 |
| 7,037,865 | B1 * | 5/2006 | Kimberly | B29C 70/60 264/103 |
| 7,186,310 | B2 * | 3/2007 | Yamaguchi | B29C 70/088 156/245 |
| 8,092,858 | B2 | 1/2012 | Smith | |
| 8,334,055 | B2 * | 12/2012 | Le Gall | B32B 5/245 428/621 |
| 8,440,296 | B2 * | 5/2013 | Kipp | C04B 28/26 264/241 |
| 8,445,101 | B2 * | 5/2013 | Kipp | C04B 28/26 428/318.4 |
| 2003/0175497 | A1 * | 9/2003 | Kobe | C09J 7/0289 428/317.9 |
| 2003/0176128 | A1 * | 9/2003 | Czaplicki | B32B 15/08 442/175 |
| 2005/0064183 | A1 * | 3/2005 | Lunsford | B32B 5/16 428/354 |
| 2006/0165972 | A1 * | 7/2006 | Chimelak | B32B 5/18 428/319.1 |
| 2006/0264556 | A1 * | 11/2006 | Lustiger | B62D 29/043 524/451 |
| 2007/0032575 | A1 * | 2/2007 | Bulluck et al. | 523/219 |
| 2008/0217811 | A1 * | 9/2008 | Wolf | B29B 17/0404 264/238 |
| 2009/0004459 | A1 * | 1/2009 | Kipp | C04B 28/26 428/318.4 |
| 2009/0239059 | A1 * | 9/2009 | Kipp | C04B 28/26 428/323 |
| 2010/0021718 | A1 * | 1/2010 | Vos et al. | 428/315.9 |
| 2010/0129576 | A1 * | 5/2010 | Zhang | B32B 27/12 428/36.6 |
| 2012/0251815 | A1 * | 10/2012 | Howells | B32B 5/20 428/316.6 |
| 2013/0154154 | A1 * | 6/2013 | Rodman | B29C 43/003 264/257 |
| 2015/0300019 | A1 * | 10/2015 | Li | B32B 5/024 428/188 |

OTHER PUBLICATIONS

Hauptli & J. Winski, Direct processing of long fibre reinforced thermoplastics: selecting a feeding system. Plastics additives and Compounding, 39, 2003.

Ning, et al., Design, manufacture and analysis of a thermoplastic composite frame structure for mass transit, Composite Strucutres, 80 (2007), 105-116.

Koopman, et al., Compression testing of hollow microspheres (microballoons) to obtain mechanical properties, Scripta Materialia 50, 593-596, 2004.

Yung, et al., Preparation and properties of hollow glass microspher-filled epoxy-matrix composites, Composites Science and Technology, Nov. 1, 2008.

Baumeister, et al., Lightweight, hollow-sphere composite (HSC) materials for mechanical engineering applications, Journal of Materials Processing Technology, vol. 155-156, Nov. 30, 2004, pp. 1839-1846.

Thomason, et al., Influence of fibre length and concentration on the properties of glass fibre-reinforced polypropylene: 1. Tensile and flexural modulus, Composites: Part A 27A, 1996.

* cited by examiner

MODULAR SHELTERS COMPRISING COMPOSITE PANELS

CROSS-REFERENCE TO RELATED APPLICATIONS

This application is the 35 U.S.C. § 371 national stage of PCT Application No. PCT/US2013/032364, filed Mar. 15, 2013, which is entirely incorporated herein by reference and which also claims priority to, and the benefit of, U.S. provisional application entitled "SHELTER COMPRISING MODULAR PANELS" having Ser. No. 61/692,745, filed on Aug. 24, 2012, which is entirely incorporated herein by reference.

STATEMENT REGARDING FEDERALLY-SPONSORED RESEARCH OR DEVELOPMENT

This invention was made with government support under Grant/Contract Number SBIR Phase II Grant No. 1058155 awarded by the National Science Foundation. The government has certain rights in the invention.

BACKGROUND

Severe weather phenomena present danger to both life and property. For instance, the wind and flying debris generated by tornadoes and hurricanes can destroy buildings, such as homes, schools, farm houses, and office buildings, and can injure or kill persons within them. Although protective structures have been proposed to protect against such harm, they tend to be made of heavy and/or expensive materials that typically do not integrate well with conventional structures. It therefore can be appreciated that it would be desirable to have alternative structures for protecting people and property from injury caused by severe weather.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure.

DETAILED DESCRIPTION

As described above, it would be desirable to have alternative structures for protecting people and property from injury caused by severe weather. Disclosed herein are embodiments of such structures. In some embodiments, the structures comprise modular shelters that can be easily integrated into conventional buildings. The shelters comprise composite panels that, in some embodiments, include an energy-absorbing core that is positioned between relatively stiff outer layers. In some applications, the panels can be used independent of a shelter. For example, the panels can be used to shield windows of a building.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
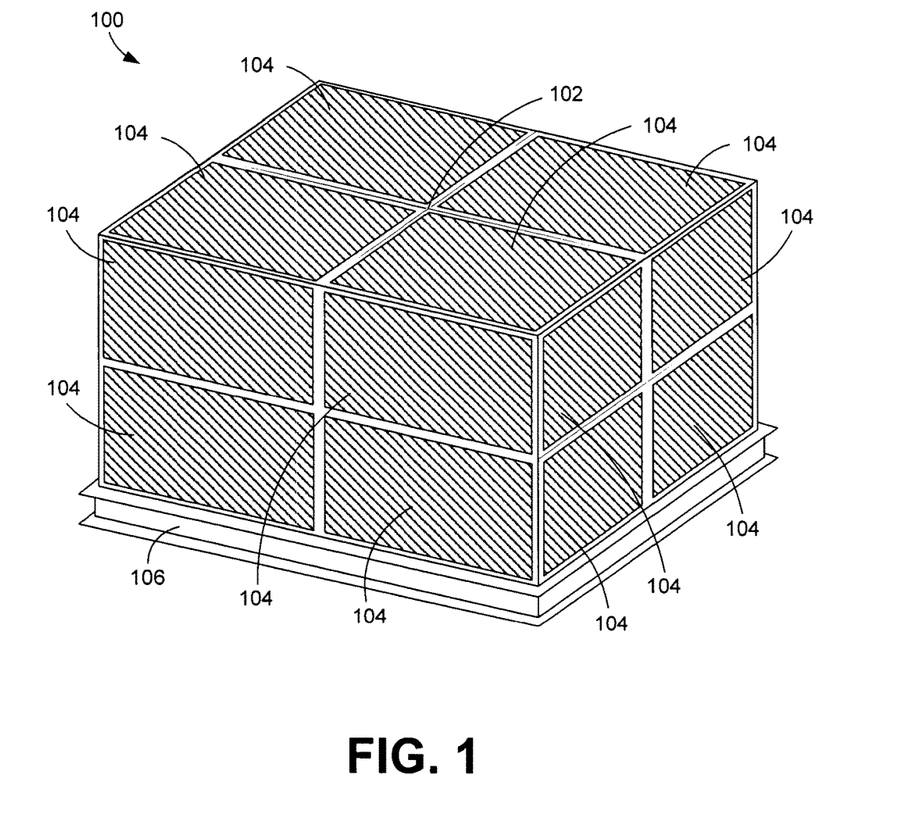
FIG. 1 is a perspective view of an embodiment of a modular shelter.

FIG. 1 illustrates an example modular shelter 100. While FIG. 1 shows a particular configuration, it is noted that this configuration is illustrated merely for purposes of example. In some embodiments, the shelter 100 can be integrated into an existing or future building. For example, the shelter 100 can be integrated into a bathroom or closet of the building and have the appearance and function of such a space. As shown in FIG. 1, the shelter 100 generally includes a frame 102 that supports multiple impact-resistant panels 104. The frame 102 can be mounted to a base 106, which can be, for example, secured to a floor of the building structure, such as a concrete slab.

The frame 102 is constructed of a relatively rigid material. Such a material can, for example, be one or more of a thermoset or thermoplastic composite material, steel, aluminum, or any other type of material that can provide structural support to the shelter 100. In some embodiments, the materials used to construct the frame 102 can include recycled materials that have been decommissioned from previous uses, such as offshore pipe insulation or manufacturing scrap. As an example, if the frame 102 comprises a thermoset or thermoplastic composite material, one or more of the components of the frame can be formed from scrap material that is a waste byproduct when constructing enclosures for semi-trailers. Such scrap may include, for example, glass fiber contained in a thermoplastic resin.

The frame 102 can be unitarily formed from a single piece of material or can comprise multiple independent components that have been secured together, for example, using fasteners, adhesives, thermal bonding, or the like. When the frame 102 is formed from independent components that are secured together, the components can be joined together at a factory in a pre-fabrication context or at an installation site during installation of the shelter 100.

The base 106 facilitates attachment and retention of the shelter 100 to the floor of the building structure in which the shelter is installed. The base 106 can comprise one or more beams, plates, anchors, or platforms, which can be made of a strong material such as steel. The base 106 can be attached to the floor using bolts, screws, hooks, or other types of fasteners. In alternative embodiments, the base 106 can be welded to a beam or other structural component that is located in or attached to the floor.

The frame 102 can be attached to the base 106 using, for example, screws, bolts, rivets, welds, or any other type of attachment mechanism. The panels 104 can be mounted to the frame 102 using fasteners, thermal bonds, adhesives, or other elements or mechanisms.

In some embodiments, the panels 104 may be arranged and mounted so that the edges of adjacent panels abut. Cutouts can also be created in the panels to accommodate plumbing, electrical wiring, fixtures, venting holes, or other features. Thereafter, the plumbing, electrical wiring, and/or fixtures, such as toilets, sinks, cabinets, or any other component, may be installed in the shelter 100. Further, a door can be integrated into the frame 102 and/or one or more of the panels 104.

With the shelter 100 assembled and installed, it may be used as a conventional space in the building. For instance, the shelter 100 may function as a conventional closet or bathroom. In the case of a hazardous event, such as a tornado or hurricane, people and property may be moved into the shelter 100, and the door may be locked. If the building structure is destroyed, for example, by being blown away by strong winds, the shelter 100 may remain and provide safety for the people and/or property contained therein. If the base 106 of the shelter 100 is affixed to the floor of the building and anchored to a concrete foundation, the shelter may be prevented from blowing away. Also, if the building collapses on top of the shelter 100, the frame 102 may provide support for the shelter and prevent it from caving in. Additionally, the panels 104 may prevent debris or other projectiles that are propelled by strong winds from penetrating the walls and ceiling of the shelter 100.

Figure 2:
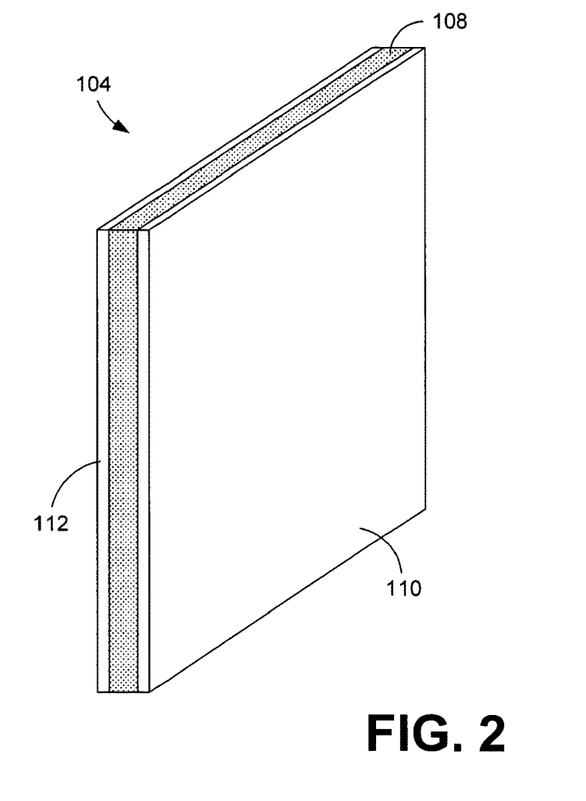
FIG. 2 is a perspective view of an embodiment of a panel that can be used in the shelter of FIG. 1.

FIG. 2 illustrates an example construction for the panels 104 of the shelter 100. As noted above, the panels 104 can be used separately from the shelter 100. For example, the panels 104 can be used to shield windows of a building from flying debris. Irrespective of the application of the panels 104, the panels can, in some embodiments, pass EF5 tornado testing as set forth by the National Storm Shelter Association (NSSA) and the International Code Council (ICC 500-2008).

As shown in FIG. 2, the panel 104 can comprise a composite sheet material that includes a core 108 that is positioned between first and second outer layers 110 and 112. The outer layers 110, 112 are designed to distribute the force of projectiles that impact the panel 104 and the core 108 is designed to absorb the energy of the distributed force. In some embodiments, the core 108 is made of an energy-absorbing foam material and the outer layers 110, 112 are made of a fiber-reinforced material. In some embodiments, the core 108 is thicker than the outer layers 110, 112. By way of example, the core 108 can be approximately 10 to 25 mm thick and the outer layers 110, 112 can be approximately 3 to 6 mm thick. In such cases, the panel 104 can have a thickness that is similar to conventional wallboard materials. As a specific example, the core 108 can be approximately 0.5 inches (12 mm) thick and the outer layers 110, 112 can be approximately 0.25 (6.25 mm) inches thick, in which case the panel 104 is approximately an inch (25.4 mm) thick.

Figure 3:
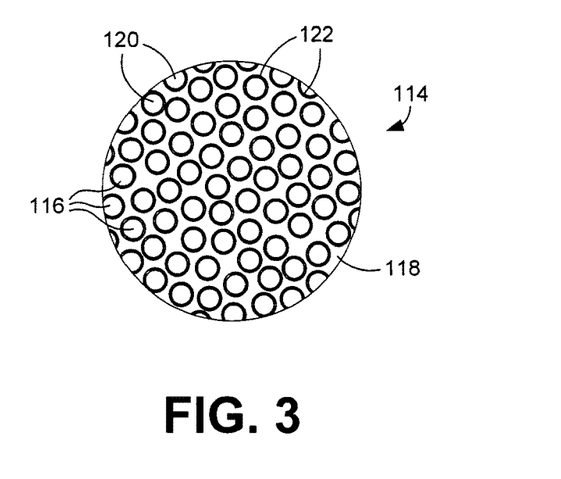
FIG. 3 is a schematic view of an embodiment of the construction of an energy-absorbing core of the panel of FIG. 2.

As indicated above, the core 108 can be made of an energy-absorbing foam material. In some embodiments, the foam material is a syntactic foam material that comprises a plurality of microspheres (also referred to as cenospheres or microballoons) that are compounded with a thermoplastic resin. Such a construction is schematically depicted in FIG. 3, which shows a foam material 114 that comprises microspheres 116 compounded with a resin 118. As is apparent from FIG. 3, the microspheres 116 are very small, hollow spherical elements having an interior void 120 that is enclosed by a thin outer shell 122. Because much of the volume of the microspheres 116 is void space (e.g., air), the microspheres, and therefore the foam material 114, is very lightweight. By way of example, the foam material 114 has a density of approximately 0.3 to 0.9 g/cc, and the microspheres 116 comprise approximately 30% to 35% of the foam material by volume percentage. In some embodiments, the core 108 can have superior impact energy absorption from threats such as flying debris or fragments. As an example, for a 75 joule impact to a panel having a 60 weight percent (wt %) glass fiber-reinforced thermoplastic outer layer and a glass microsphere-thermoplastic inner core, the normalized energy to maximum load can be 8,500 kg-m/m without failure. For comparison, plywood of similar areal density exhibits a normalized energy to maximum load of 520 kg-m/m with complete penetration failure for a 19 mm (0.75 inch) hemispherical impactor. In some embodiments, the microspheres 116 have a nominal outer diameter of approximately 0.1 mm to 1.0 mm and the shells 122 can have a thickness of approximately 20 μm to 200 μm. The microsphere shells 122 can be made of substantially any material that can be formed (e.g., blown) into a very small hollow sphere. By way of example, the microspheres shells 122 can be made of a polymeric, ceramic, glass, or metal material.

The resin 118 can comprise a polymeric resin. In some embodiments, the resin is a thermoplastic resin comprising an olefin, such as polypropylene or polyethylene. Alternatively, the thermoplastic resin can comprise an engineered polymer, such as polyamide, polyether ether ketone (PEEK), polyether ketone (PEK), polyethyleneimine (PEI), polyphenylene sulfide (PPS), or the like.

The outer layers 110, 112 can comprise reinforced sheet material that includes fibers compounded with a thermoplastic resin. In some embodiments, the thermoplastic resin can comprise an olefin, such as polypropylene or polyethylene or an engineered polymer, such as polyamide, polyether ether ketone (PEEK), polyether ketone (PEK), polyethyleneimine (PEI), polyphenylene sulfide (PPS), or the like. In some embodiments, the fibers comprise glass fibers such as E-glass fibers, which comprise alumino-borosilicate glass with less than 1% w/w alkali oxides.

One or more components of the panel 104 can be constructed using recycled materials. For instance, pipe wrapping from decommissioned offshore pipes used in the oil and gas industry can be shredded and used to form the core 108 in an extrusion-compression molding (ECM) process. In such a process, scrap material and waste are shredded and, optionally, virgin thermoplastic resin is added in small quantities to assist in a flow molding process. The shredded mixture can be introduced into a hopper of a heated low-shear single screw extruder (also called a plasticator), possibly along with compounded microspheres, fiber-resin pellets, and other additives. The material homogenizes in the plasticator to produce a charge that can be transferred to a two-cavity mold that is pressed at a high rate of speed to form the desired shape (e.g., flat sheets) of the core 108 of the panel 104.

In some embodiments the outer layers 110, 112 can also be formed from recycled materials. For example, the edge trim from semi-trailers, portions of decommissioned aircraft, or portions of body armor (e.g., helmets, vests, etc.) can be shredded and also used to form flat sheets using an ECM process.

Irrespective of the manner in which the core 108 and the outer layers 110, 112 are formed, the outer layers can be bonded or otherwise attached to the core. In some embodiments, the outer layers 110, 112 can be applied to the core 108 using a continuous process (e.g., with a double-belt press) in which a continuous sheet of panel material is formed and discrete lengths can be formed by cutting the continuous sheet. In some embodiments, the charge and the outer layers are consolidated in a 4×8 foot scale compression mold.

A study was conducted to evaluate panels having constructions similar to those described above. The panels were made from recycled scrap material. Some of the panels had cores made of a compounded polypropylene and glass microballoons (PP-GMB) and other panels had cores made of a composite of polypropylene and fly ash microballoons (PP-FMB). The outer layers for each panel were made of a glass fiber-reinforced polypropylene (PP-GF). The panels were tested for impact resistance as well as flexural and tensile modulus and strength.

The study focused on materials and process development of different types of recycled and reusable materials. The PP-GMB and PP-FMB were obtained from power plant waste while the PP-GF was obtained from edge and bulk trim from semi-trailers. When combined and re-processed in innovative ways, these materials are energy efficient because they offer superior specific strength and specific stiffness at significantly reduced weight and cost.

A cost-effective ECM processing approach was undertaken in the study to produce monolithic and sandwich composite panels from the above-described constituent materials. A sandwich composite is structurally efficient because it comprises a lightweight core that resists shear forces bounded by stiff and strong layers that resist bending forces. The constituent materials are extremely lightweight. The densities of the polypropylene, glass microballoons, and fly ash microballoons were 1.2 g/cc, 0.3-0.6 g/cc, and 0.8 g/cc respectively.

One of the goals of the study was to investigate the feasibility of reprocessing scrap (regrind) material from truck trailers that extensively use PP-GF. About 20,000-50,000 pounds of such scrap is generated each month from edge trims and bulk parts of trailer manufacturing and it is typically disposed of as landfill. Scrap edge trim PP-GF material was received in rolls (also called ribbons) and was then shredded to form flakes and pellets of lengths ranging from 12 mm to 25 mm. The flakes and pellets were fed through an ECM process, using similar steps to those used to manufacture the GMB and FMB cores. The PP-GF scrap material was produced in weight percentages in the range of 30 wt % fiber scrap to 60 wt % scrap. Virgin polypropylene was used along with the scrap. Plywood-backed sheet metal facings and conventional 30% fiber weight long fiber thermoplastic PP-GF (LFT) were also considered for purposes of comparison. Low velocity impact (LVI) tests were conducted with a 6 kg impact mass at 10, 15, and 20 cm impact heights.

Figure 4:
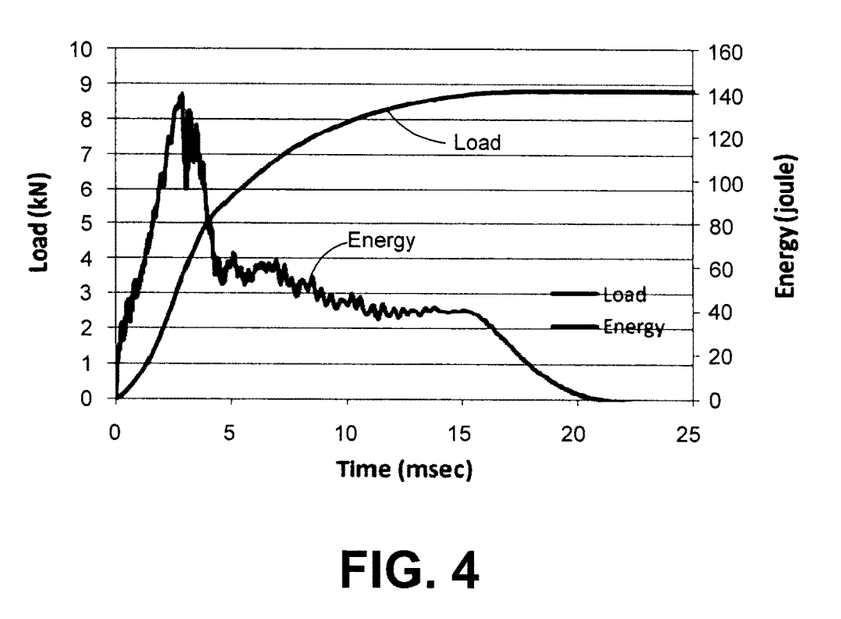
FIG. 4 is a graph that plots load and energy versus time observed during panel testing.

Table 1 compares density and thickness of plywood to representative weight fractions of 30 wt % and 60 wt % reprocessed PP-GF scrap from trailer manufacturing and standard LFT. Panels were tested using an instrumented drop tower to compare their impact properties. Impact samples with a dimensions of 100×100 mm were prepared and the samples were impacted with a hemispherical-shaped impactor. Typical curves for load versus time and energy versus time during impact are shown in FIG. 4. Samples were clamped between two metal plates with a 3-inch diameter opening in the center where the impact took place. Two parameters, normalized maximum load and normalized energy to maximum load, were compared for each sample. Maximum load is the load the sample can bear before failure occurs. Energy to maximum load is the energy that the sample can absorb before failure takes place.

TABLE 1

Comparison Of Materials For Use For Trailer Applications

|  | Plywood | 60 wt % regrind | 30 wt % regrind | 30 wt % LFT |
|---|---|---|---|---|
| Areal density (g/cm²) | 0.38 | 0.54 | 0.41 | 0.40 |
| Thickness (mm) | 6 | 3.8 | 3.4 | 3.6 |

Figure 5:
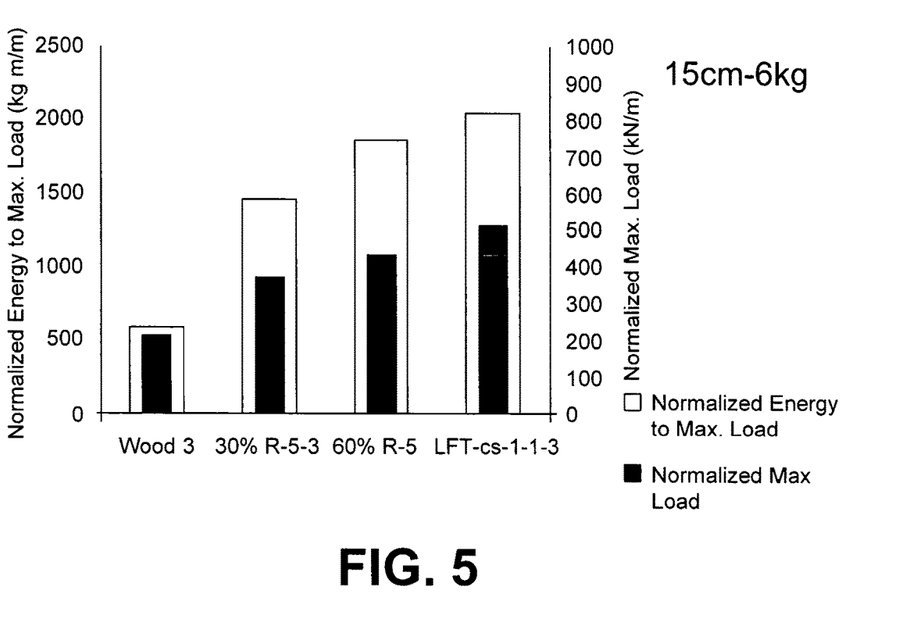
FIG. 5 is a graph that plots normalized impact energy and normalized load of a 6 kg impact mass at a 15 cm height for plywood, 30 wt % scrap, 60 wt % scrap, and conventional LFT.

FIG. 5 shows representative results of normalized energy and normalized load of the 6 kg impact mass at a 15 cm impact height for plywood, 30 wt % PP-GF scrap, 60 wt % PP-GF scrap, and conventional LFT. The results show that the scrap material at 30 wt % and 60 wt % fiber loading was more effective in absorbing energy and had a significantly higher damage tolerance than plywood. Plywood, which is the baseline, exhibited the poorest performance when subjected to impact. Fully virgin LFT performed the best, but was also the most expensive.

Lightweight core materials of PP-GMB and PP-FMB with outer layers made of PP-GF were evaluated for their processability and resulting performance. During the fabrication process, glass microspheres or fly ash microballoons were mixed with powdered polypropylene resin in a drum mixer. The mixture was then introduced into the hopper of a heated-screw plasticator. The mixture was then heated and mixed further along the screw and extruded as a roughly 3.5 cm diameter charge of hot resin and filler. The charge was then placed into a 30.5 cm×30.5 cm tool and pressed into flat sheets. The glass microspheres (SID-311Z Ecospheres) were obtained from Trelleborg Offshore Boston, Mansfield Mass. The fly ash microballoons, which were manufactured from the fly ash waste of power plants and is composed of hollow ceramic microspheres, were also supplied by Trelleborg. The polymer used was Profax 6301 supplied by Ashland Chemical Co.

The composite outer layers were produced both with the recycled PP-GF and with conventional E-glass Polystrand® unidirectional tape in polypropylene resin and were supplied as cross-ply 0/90 sheets. The cores and the outer layers were consolidated to form a sandwich plate in an autoclave at 450 K to 460 K and 345 kPa. A top caul sheet was used to control the thickness and polymer flow. In all cases, some flow of core material was evident.

Over thirty panels were molded in total using PP-GMB and PP-FMB for the core material. Table 2 provides a summary of the test panels with processing/material variables. Because the sandwich composites were designed to carry higher impact loads, they were constructed from traditional cross-ply 0/90 PP-CF outer layers, which were either co-molded during ECM or autoclave-bonded to the core. These two processes were used to determine which process provides the highest interfacial bond between the core and the outer layer. The choice of E-glass was dictated by the need to produce a panel for commercial sale at the lowest possible cost, although some S-2 Polystrand® (higher cost, higher performance) outer layers can be molded.

TABLE 2

Summary of Evaluated Test Panels

| Panel | Core Type | Facesheets | Processing Conditions | Explanation# |
|---|---|---|---|---|
| Panel 1 | FMB | 2 PS^ | ECM | 2 Facesheets bonded during ECM |
| Panel 2 | FMB | (1 + 1) PS | ECM + autoclave | 1 Facesheets bonded during ECM and 1 with autoclave |
| Panel 3 | FMB | 2 PS | ECM | 2 Facesheets bonded during ECM |
| Panel 4 | FMB | (1 + 1) PS | EMC + autoclave | 1 Facesheets bonded during EMC and 1 with autoclave |
| Panel 5 | GMB | (1 + 1) PS | EMC + autoclave | 1 Facesheets bonded during ECM and 1 with autoclave (300 tons pressure) |
| Panel 6 | GMB | 2 PS | ECM | 2 Facesheets bonded during ECM |

Figure 6A:
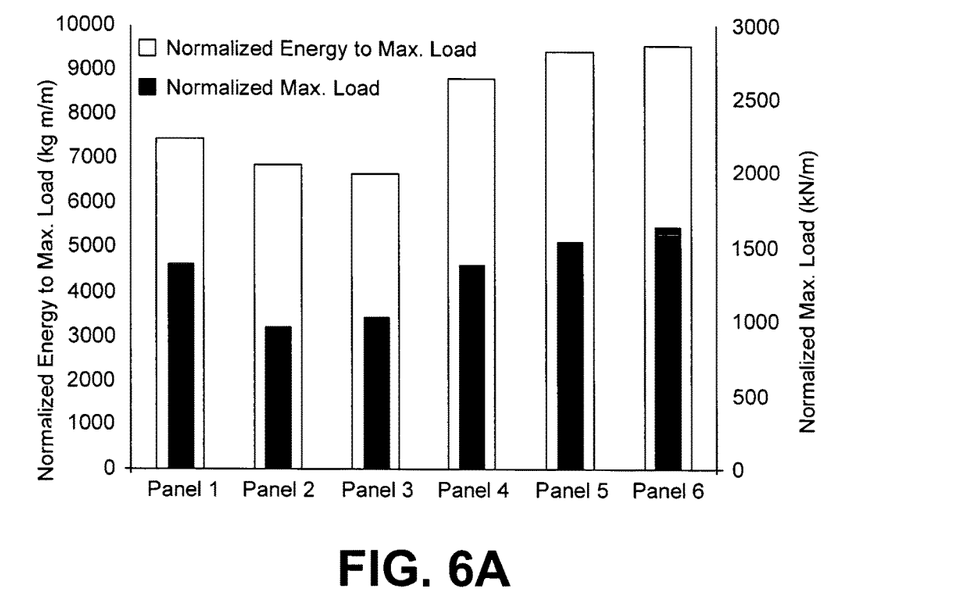
FIGS. 6A and 6B are graphs that compare normalized maximum load and normalized energy to maximum load for energy levels of 75 joules and 136 joules, respectively.
Figure 6B:
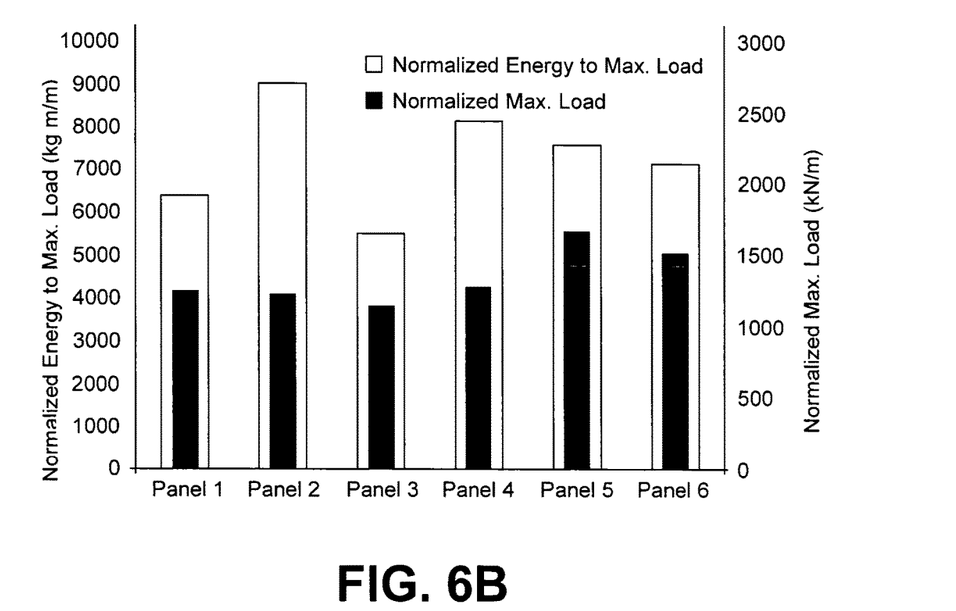

The sandwich panels outlined in Table 2 were tested for their LVI impact. Two impact energy levels, 75 and 136 joules, were used to initiate different extents of damage. The results are shown in FIGS. 6A and 6B.

Figure 7:
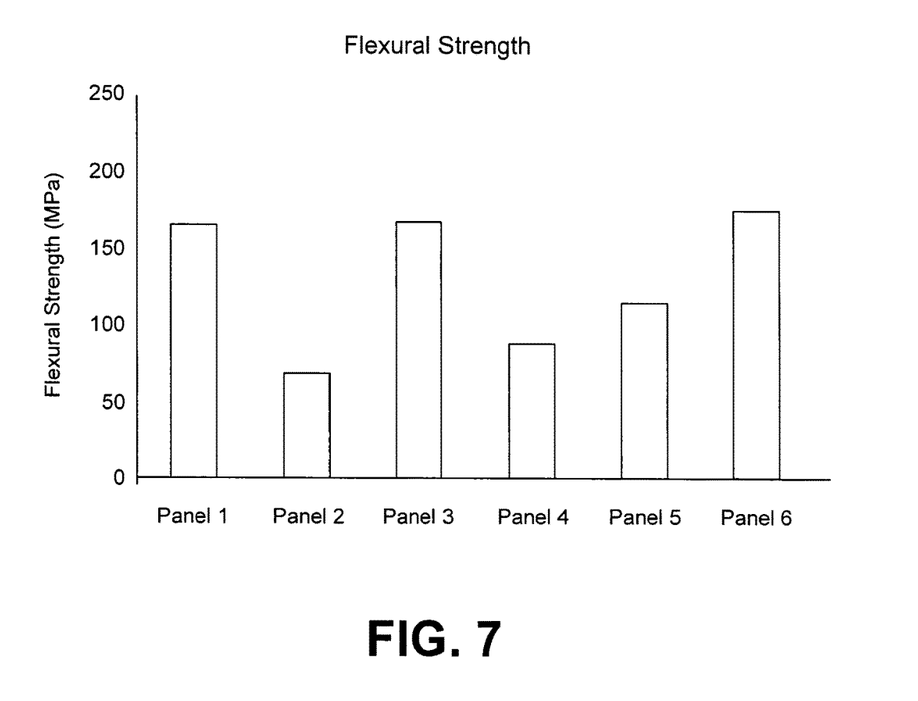
FIG. 7 is a graph that identifies the flexural strength of multiple tested panels.

It can be inferred that the samples with glass microballoon cores have higher normalized maximum loads and energy to maximum loads, indicating that these samples possess greater energy absorption capability before failure. There was a difference in failure mode based on how the samples were processed (i.e., two layers of PP-GF integrally bonded to the core during the ECM process, or one layer of PP-GF integrally bonded during the ECM process and then bonding the second layer by autoclave molding). Panels 2, 4, and 5 (processed with autoclave molding) exhibited higher energy values, which can be attributed to energy absorbed by delamination of the outer layers. The second layer of 0/90 cross-ply PP-GF bonded to the core by autoclave molding resulted in a weaker bond. This weak bond acts as an energy absorbing mechanism, thereby contributing to energy absorption. The LVI results were also confirmed by the flexural strength data, which are shown in FIG. 7. The flexural strength of samples processed with autoclave molding (Panels 2, 4 & 5) was lower compared to the samples processed by ECM (Panels 1, 3, & 6).

Two types of failure modes were observed in flexure. First, failure starts with the failure of the top outer layer followed by delamination between outer layer and the core. Second, samples fail by delamination between the outer layers.

It is apparent from the test results that the glass microballoons and fly ash microballoons are best utilized when they are subjected to compounding with the polypropylene in a twin-screw extrusion process. For the studies, the glass microballoons and fly ash microballoons were mixed with polypropylene in a powder form using a drum mixer and then this material was processed in the low-shear plasticator. This approach created the following issues: (i) separation of the microballoon and polypropylene particles when the material is left to stand, (ii) volume/weight consistency when feeding the material into the plasticator, and (iii) clogging of partially melted material in the plasticator screw with changes in concentration of polypropylene and microballoons.

The PP-GMB or PP-FMB charge (extrudite), and subsequently the core material, had sections with inconsistent weight fraction of polypropylene and microballoons. For the processing system used in the study, the starting polymer was in a powder form, which increases processing challenges with differential densities.

Under impact, the panels absorbed energy through a combination of modes including deflection, fiber breakage, and delamination of back plies. Panels with glass microballoon cores failed at higher loads than those with fly ash microballoon cores. This could be because of differences in the particle loading or a higher crushing strength of the glass microballoons. Panels processed by adding an additional layers of PP-GF to a panel with a ply already attached to the core showed greater evidence of de-bonding, which could be remedied using a film of thermoplastic between the first and second plies. However, the delamination does function as a mechanism to partially absorb the kinetic energy of the impactor.

The invention claimed is:

1. A method for fabricating a panel, the method comprising:
   mixing a plurality of hollow microspheres with a polymeric resin to form a first charge;
   extruding the first charge using a plasticator to form a second charge for a syntactic foam core of the panel;
   co-molding a first reinforced composite sheet material layer together with the second charge in a compression mold to bond the first reinforced composite sheet material layer on one side of the syntactic foam core of the panel resulting from the second charge; and
   bonding a second reinforced composite sheet material layer on another side of the syntactic foam core of the panel.

2. The method of claim 1, further comprising, prior to mixing, shredding scrap material to obtain at least a portion of the polymeric resin.

3. The method of claim 1, further comprising, prior to co-molding, mixing glass fibers with resin to form a third charge and extruding the third charge to form at least one of the first reinforced composite sheet material layer or the second reinforced composite sheet material layer.

4. The method of claim 3, further comprising, shredding scrap material to obtain shredded fiber-reinforced thermoplastic flakes or pellets that form the third charge.

5. The method of claim 2, further comprising adding virgin resin to the shredded scrap material so that the virgin resin is mixed with the shredded scrap material prior to extruding.

6. The method of claim 1, wherein the plasticator comprises a heated single screw extruder.

7. The method of claim 1, further comprising, prior to co-molding, transferring the second charge to a mold and pressing the second charge to shape the second charge.

8. The method of claim 7, wherein the mold comprises a two-cavity mold.

9. The method of claim 3, further comprising, prior to co-molding, pressing the third charge to form a shape for at least one of the first reinforced composite sheet material layer or the second reinforced composite sheet material layer.

10. A method for fabricating a panel, the method comprising:
    mixing a plurality of hollow microspheres with a thermoplastic resin to form a first charge, each of the plurality of hollow microspheres comprising a void;
    extruding the first charge using a plasticator to form a second charge for a syntactic foam core of the panel;
    co-molding a first reinforced composite sheet material layer together with the second charge in a compression mold to bond the first reinforced composite sheet material layer on one side of the syntactic foam core of the panel resulting from the second charge; and bonding a second reinforced composite sheet material layer on another side of the syntactic foam core of the panel.

11. The method of claim 10, further comprising, prior to mixing, shredding scrap material to obtain at least a portion of the thermoplastic resin.

12. The method of claim 10, further comprising, prior to co-molding, mixing glass fibers with resin to form a third charge and extruding the third charge to form at least one of the first reinforced composite sheet material layer or the second reinforced composite sheet material layer.

13. The method of claim 12, further comprising, shredding scrap material to obtain shredded fiber-reinforced thermoplastic flakes or pellets that form the third charge.

14. The method of claim 13, further comprising adding virgin resin to the shredded scrap material so that the virgin resin is mixed with the shredded scrap material prior to extruding.

15. The method of claim 10, wherein the plasticator comprises a heated single screw extruder.

16. The method of claim 10, further comprising, prior to co-molding, transferring the second charge to a mold and pressing the second charge to shape the second charge.

17. The method of claim 16, wherein the mold comprises a two-cavity mold.

18. The method of claim 12, further comprising, prior to bonding, pressing the third charge to form a shape for at least one of the first reinforced composite sheet material layer or the second reinforced composite sheet material layer.

* * * * *